Nov. 10, 1964       E. G. COLLEN       3,156,759
DUAL CANTILEVER MOUNTED SCANNING MECHANISM
Filed Jan. 13, 1961                     5 Sheets-Sheet 1

EDWIN G. COLLEN
INVENTOR.

BY
ATTORNEYS

United States Patent Office 3,156,759
Patented Nov. 10, 1964

3,156,759
DUAL CANTILEVER MOUNTED SCANNING
MECHANISM
Edwin G. Collen, Morris Plains, N.J., assignor to General
Precision Inc., Little Falls, N.J., a corporation of
Delaware
Filed Jan. 13, 1961, Ser. No. 82,499
1 Claim. (Cl. 88—97)

The present invention relates to a scanning mechanism, and particularly to a scanning mechanism for scanning a very small field of view.

When tracking a star by means of a star tracker, the star image is focused on a detector located at the focal plane of the tracking instrument telescope. The position of the star image on the detector is then found by a scanner, which scans the detector in a systematic fashion. This positional information is fed to a servo system which will move the telescope about so that the star image continually tends to be at the center of the detector. If the tracking of the star is against daylight sky background, considerable difficulty is caused by the sky background noise. The most satisfactory means of improving the signal to noise ratio is to reduce the instantaneous field of view to the smallest practical limit. Optically it is possible to reduce the field of view to about 20 seconds of arc. This then requires a small scanner mechanism to move the scanner in the scanning pattern. The scanner employed may be a mirror. The scan motion in elevation and the azimuth sweep has heretofore been accomplished by means of a cam action. However, presently available mechanisms are unable to provide the small and controlled elevational scan and sweep motions necessary to scan 20 seconds of arc.

It has now been discovered that a scanning mechanism can be provided to scan small detector areas.

Thus, it is an object of the present invention to provide a scanning mechanism capable of scanning small size detectors.

A further object of the present invention is to provide a scanning mechanism which requires little motive power and is subject to very little wear and tear so as to be usable in space vehicles and remote areas.

With the foregoing and other objects in view, the invention resides in the novel arrangement and combination of parts, and in details of construction hereinafter described and claimed, it being understood that changes in the precise embodiment of the invention herein disclosed may be made within the scope of what is claimed without departing from the spirit of the invention. Furthermore, other objects and advantages will become apparent from the following description taken in conjunction with the accompanying drawing.

Generally speaking, the present invention contemplates a scanner mechanism which comprises in combination; a scanner such as a mirror; a support member on which said scanner is mounted; an intermediate retaining member at least partially transparent facing said scanner permitting the scanner to scan therethrough; crossed pivot spring means extending from said intermediate member to said mirror support; a fixed member in back of said mirror; crossed pivot spring means extending between said fixed and intermediate members; and, actuating means to cause the scanner to oscillate in elevation and azimuth.

If in carrying the invention into practice the contemplated scanner is to be installed in a star tracker for a space vehicle, the scanner, e.g., mirror used may be approximately ½" diameter by ⅛" thick and the tracking field may comprise a total angular motion in elevation of 70 arc-seconds and a total angular motion in azimuth of 140 arc-seconds. A convenient oscillatory frenquency ratio of elevation scan and azimuth sweep may be about 16 to 1 or about 64 c.p.s. in elevation to 4 c.p.s. in sweep. For the purpose of describing the present invention, an elevation scan frequency of 58.4 c.p.s. and a sweep frequency of 3.65 c.p.s. has been selected.

It is thus necessary to control the motion of a small mirror oscillating in elevation and azimuth within a very small angle at the frequencies selected. To accomplish the foregoing there is provided a small round mirror 11, mounted on an extended cylindrical mirror support 12, at the longitudinal center thereof. Facing the mirror in spaced relation thereto is an elongated intermediate support member 13, the longitudinal axis of said intermediate support member being at right angles to that of cylindrical mirror support 12. Spaced from the ends of longitudinal intermediate support member 13 are elevation retaining means 14. Extending from said elevation retaining means 14 to positions on said cylindrical mirror support 12 separated by the mirror 11 are elevation cantilever beam spring pivot means 15. These crossed spring pivots when disposed as described will permit the mirror support and mirror to oscillate in the elevation plane. Intermediate support member 13 should be at least partially transparent, i.e., it may be made of transparent material, or, may have apperatures 16 so as to permit passage of rays from mirror 11. In back of mirror 11 is a fixed member 17 so that the mirror is disposed between fixed member 17 and intermediate member 13. Fixed member 17, mirror 12 and intermediate member 13 are disposed in parallel planes. On both sides of intermediate support member 13, at positions above and below mirror 11, and at corresponding positions of fixed member 17 are azimuth retaining means 18, and disposed between the retaining means on the fixed member 17 and on intermediate member 13 are azimuth cantilever beam crossed pivot spring means 19; disposed at right angles to the elevation crossed pivot spring means 15. The mirror is therefore able to oscillate in elevation and azimuth. The frequency of oscillation in elevation and azimuth can be either the natural frequency or some sub-harmonic of the natural frequency of the crossed spring pivots for the elevation or azimuth area.

Unless this is so, the crossed spring pivots tend to oscillate at their undamped resonant frequency and will go into uncontrolled oscillations.

The precise construction of crossed spring pivots 15 and 19 depend on the method of actuation to maintain these spring pivots vibrating. Shown in the FIGS. 4 and 5 drawing are the construction used in connection with two general types of actuation arrangement, electrical i.e., electrostrictive and electro-magnetic. If the arrangement is electrical, the beams of spring pivots 15 and 19 may each be made of two different materials 20 and 21 fed by an A.-C. source 23 and a parallel arrangement 24. If the actuation is electro-magnetic, it is necessary to have a double cantilever beam 22. Each section has wire winding 25. The ends of the wire 26 are fed by an A.-C. source 27. Wire winding 25 goes from the A.-C. source around both portions of one of the cantilever beams then over to the other cantilever beam, around both portions thereof and then back to the source 27.

To determine the natural frequency in elevation and azimuth, the moment of inertia of the mirror about the elevation or X-axis is first found. It is necessary to consider the moment of inertia of the mirror $I_{xa}$ and the cylindrical mirror support $I_{xb}$, where, $I_o$ is the amount of inertia about the center of gravity of the mirror or its support
$m$ is the mass of the component $w/g$
$h$ is the distance from the center of gravity of the mass to the X-axis in inches
$L$ is the length of the X-axis spring in inches
$r$ is the radius of the body, mirror or support For the mirror $$I_{xa} = I_o = mh^2$$

$$= \frac{m}{12}(3r^2 + L^2) + mh^2$$

$$= m\frac{3r^{2o}L^2 + h^2}{12}$$

$m = 0.0368$
$I_{xa} = 0.0235$ gm.-cm.$^2$

For the cylindrical mirror support $$I_{xb} = I_o + mH^2$$

$$= \frac{mr^2}{2} + mh^2$$

$$= m\left(\frac{r^2}{2} + h^2\right)$$

Figures 1, 2, 3:
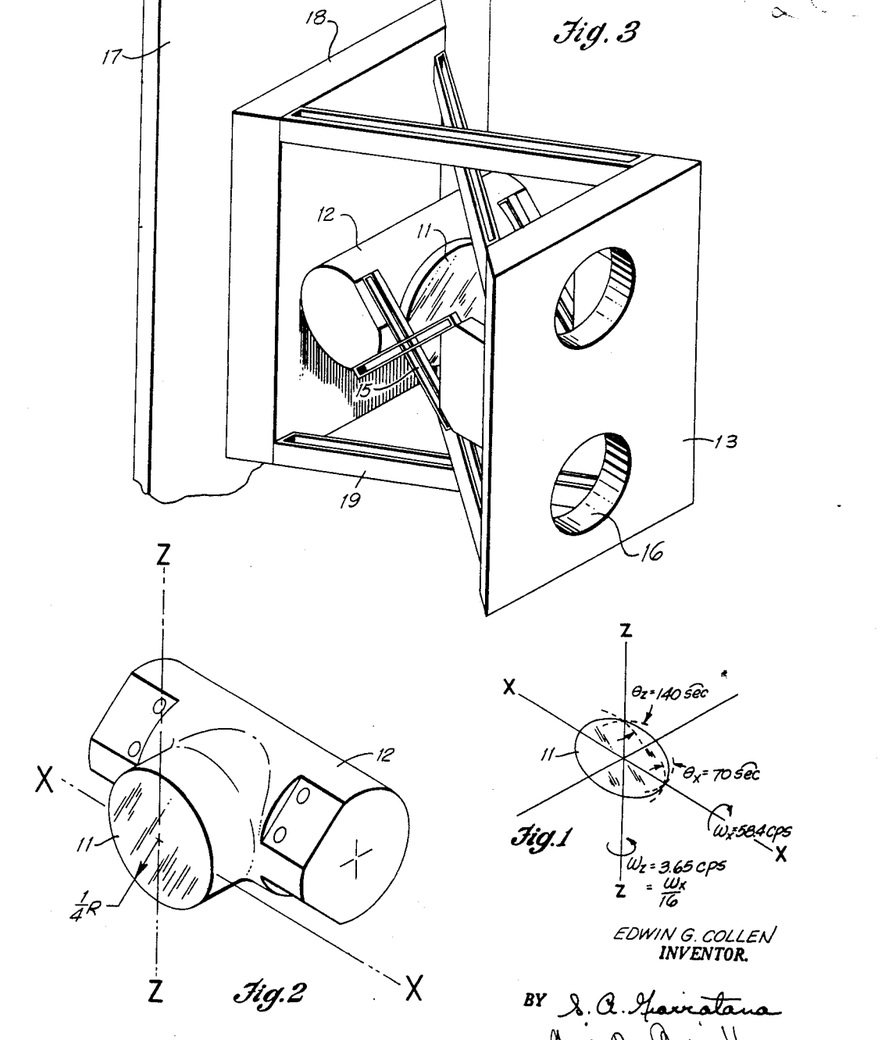
FIGURE 1 is a perspective view of a scanning mirror depicting the scanning pattern of the mirror.
FIGURE 2 illustrates a mirror mounted on a support member.
FIGURE 3 shows a perspective view of the scanning mechanism contemplated herein.

$m = 0.436$ gm.
$I_{xb} = 0.0655$ gm.-cm.$^2$ (1) Total $m$ 0.473 gm.
(2) Total $I_x$ 0.089 gm.-cm.$^2$ To the mirror and support shown in FIGURE 2 there is to be applied a pair of crossed spring pivots disposed as shown in FIGURE 3.

Figures 4, 5, 6, 8, 9:
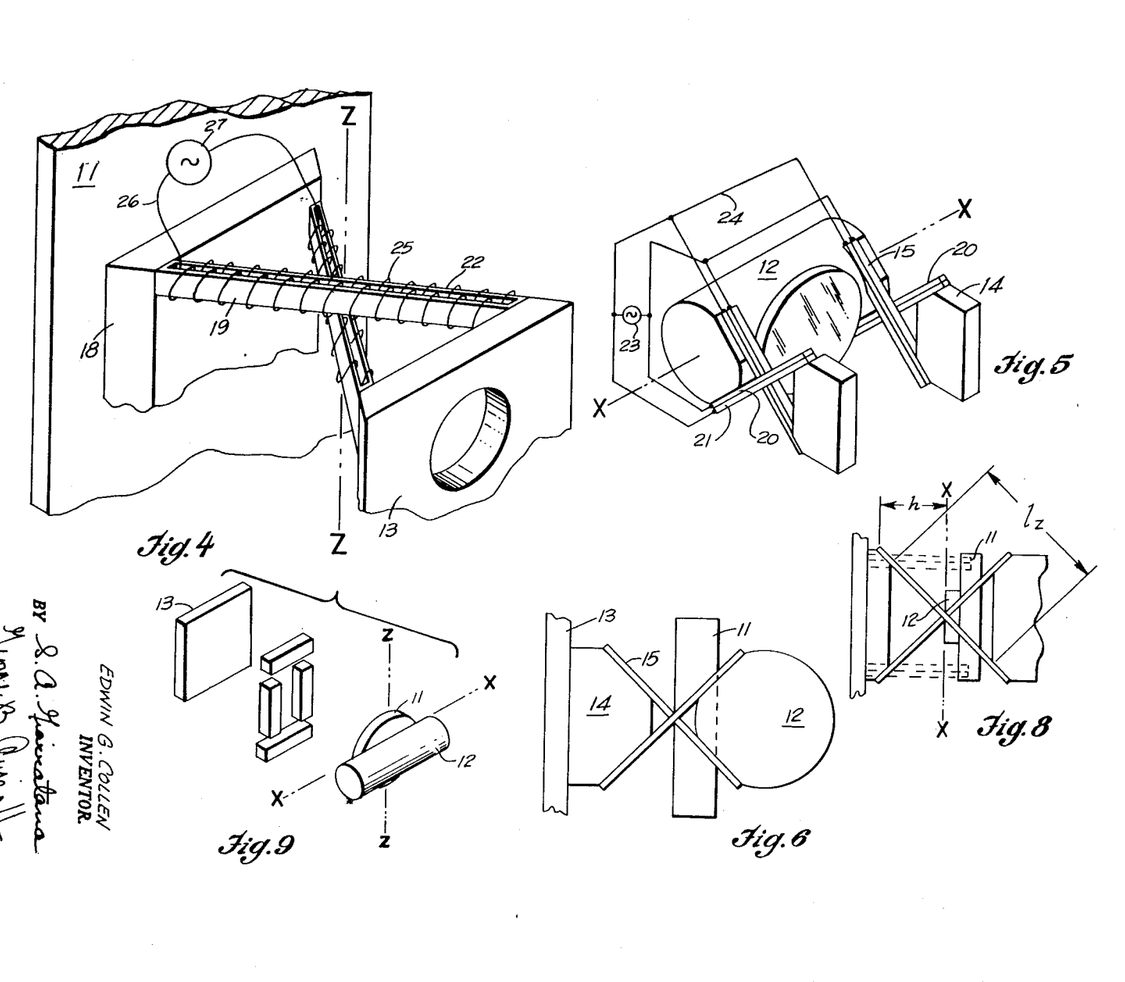
FIGURE 4 depicts a portion of the device of FIGURE 3 used for one axis of motion; and using one type of actuating means.
FIGURE 5 illustrates a portion of the device of FIGURE 3 used for the other axis of motion using another type of actuating means.
FIGURE 6 is a cross-sectional view of the portion of the device shown perspectively in FIGURE 5.
FIGURE 8 is an essembled view of the components of the device taken into consideration for calculations relating to the azimuth axis.
FIGURE 9 is a disassembled view of the components shown in FIGURE 8.

The elevation axis crossed spring pivot applied to cylindrical mirror support 12 is shown in FIGURE 4. The natural frequency of such an assembly is $$f_{nx} = \frac{1}{2\pi}\sqrt{\frac{K}{I_x}} \text{ c.p.s.} \quad (3)$$

where $I_x$ is the mass moment of inertia of support mirror about the X axis in lb.-sec.$^2$, found to be 0.89 gm.-cm.$^2$ in Equation 2;

$K$ is the total spring constant as shown below in lb./radians.

$$K = \frac{nEi}{L} + 31\frac{bd^2\theta\phi^{1.4}}{L} \quad (4)$$

("An Investigation of the Cross Spring Pivot," W. E. Young, Journ. Appl. Mechanics, N.Y., vol. 11, No. 2, June 1944.)

where $i = bd^3/12$ of the spring
$n$ = no. of springs (total) in both "arms" of spring
$E$ = modulus of elasticity
$b$ = width of each spring on a side
$d$ = thickness of springs
$L$ = unsupported spring length between mounts
$\theta$ = deflection angle, radians
$\phi$ = intersection angle of springs, degrees.

(The second term is an increase due to the angle $\theta$.)
($nb$ is the sum of the width of all springs.)
This may be rewritten $$L = \frac{E}{K} \times \frac{nbd^3}{12} + \frac{31}{K}nbd^2\theta\phi^{1.4}$$

or $$L = \frac{nbd^2}{12K}(Ed + 372\theta\phi^{1.4}) \quad (5)$$

For the X-axis (innermost), $$\theta = 70 \text{ arc-sec} = \frac{70}{2065 \times 10^5} = 3.39 \times 10^{-4} \text{ rad.}$$

The effect of the second term will be negligible and I can use $$K = \frac{Enbd^3}{12L} \quad (6)$$

substituting in (3)

$$f_{nx} = \frac{1}{2\pi}\sqrt{\frac{Enbd^3}{12I_xL_x}} \text{ c.p.s.} \quad (7)$$

To determine some appropriate values, transposing $$Lx = \frac{Enbd^3}{475f_{nx}^2I_x} \quad (8)$$

Let $$K_1 = \frac{E}{475f_{nx}^2I_x} \quad (9)$$

where $E = 30 \times 10^6$ p.s.i. (steel)
$I_x = 0.089$ gm.-cm.$^2 = 30.4 \times 10^{-6}$ lb.-in.$^2$
$f_{nx} = 58.4$ c.p.s.

then $$K = 60.8 \times 10^4 \quad (10)$$
$$L_x = 60.8 \times 10^4(nb)d^3 \quad (11)$$

Figures 7, 10:
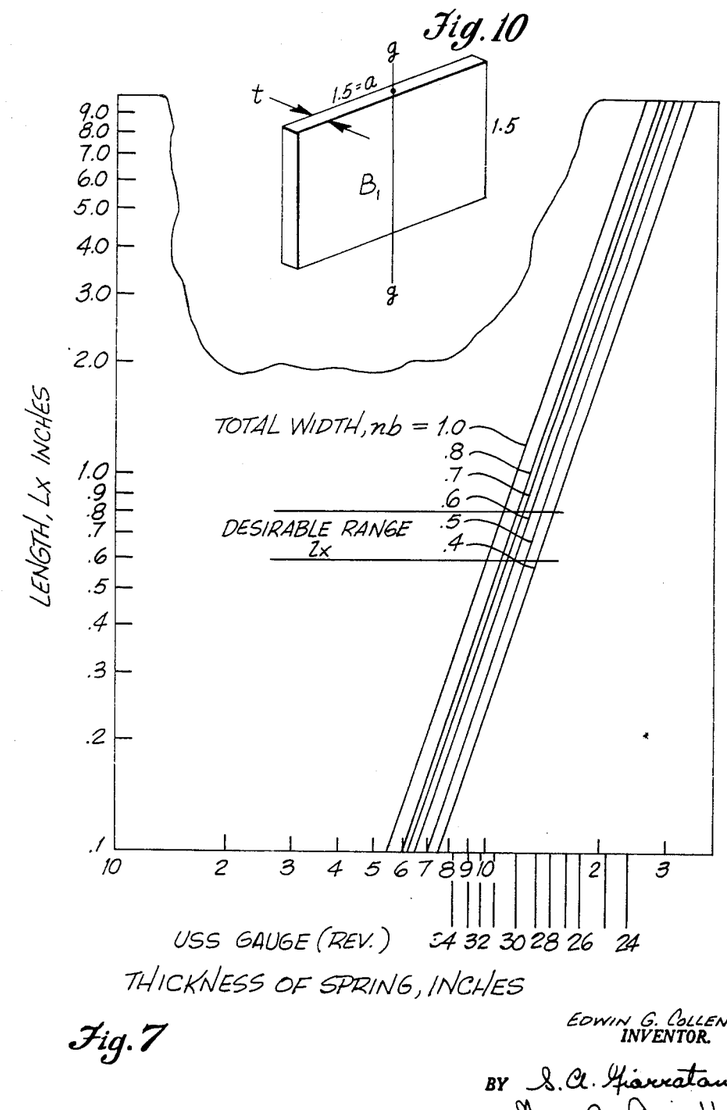
FIGURE 7 is a graph relating to the selection of material for motion about one axis.
FIGURE 10 shows a rectangular block corresponding in mass to the components of FIGURE 9.

Some likely values of $L_x$ are plotted in FIG. 7.

The relationship between displacement of the rotation axis S and the spring length L and deflection $\theta$ is:

$$S = (3.57 \times 10^{-4} - 4.44 \times 10^{-4}L)\theta$$
$$+ (5.5 \times 10^{-5} - 2.4 \times 10^{-5}L)\theta^2 \quad (12)$$

("Design Characteristics of Crossed Spring Pivots," L. W. Nickols, W. L. Wunsch, Machinery, London, Eng., vol. 79, Oct. 11, 1951.)

Where $S$ = in./in. length of spring strip
$L$ = inches length of spring strip
$\theta$ = angular rotation of pivot, degree.

Let $L = 1$ inch
$\theta = 70$ arc-sec $= 1.9 \times 10^{-2}$ deg.

then substituting in (12)

$$S = 1.661 \times 10^{-6} \text{ inch} \quad (13)$$

In terms of a six inch focal length this displacement is tantamount to $$6 \times 1.661 \times 10^{-6} = 1 \times 10^{-5} \text{ radians} = 2 \text{ arc-sec.}$$

at the extremes of the mirror's motion. The error would average 1 arc-sec, however, over the full angular travel.

Having now determined the parameters of the X-axis crossed springs, it is necessary to determine the same for the z-axis spring.

To determine the dimensions of the z-axis springs, a chart similar to FIGURE 7 must be made. This chart is of length $L_z$ vs thickness $d_z$. However, the length of these springs is a function of the moment of inertia of all the components oscillating about the z-axis. This group of components includes the mirror support 12, the intermediate member 13 and the x-axis springs. The moment of inertia of the z-axis springs is neglected in the forthcoming determination of $I_z$. The moment of inertia of mirror support 12 and the x-axis springs is a constant about the z-axis. The moment of inertia of intermediate member 13 about the z-axis is dependent on the function of $L_z^2$.

The expression $L_z$ vs. $d_z$ then becomes implicit, since the frequency expression contains a function of $1/L_z$ and the above.

The following definitions may first be given:

$I$ = Moment of intertia, lb.-in.$^2$
$L_z$ = length of a z-axis spring, in.
$d$ = Thickness of a z-axis spring, in.
$n$ = number of z-axis spring (integer)
$b$ = width of one z-axis spring, in.
$h$ = distance from C.G. of a mass to z-axis, inches
$m$ = mass of a component = $w/g$
$f_{oz}$ = oscillation frequency about the z axis (3.65 c.p.s.)
$f_{nz}$ = natural frequency about the z-axis in c.ps.

The following subscripts are used $z$ = about the z-axis
$g$ = about the C.G. of the item
$B$ = intermediate member 13
$C$ = mirror 12
$o$ = oscillation frequency of beam
$n$ = natural frequency of beam
$s$ = spring ($I_{x_{zs}}$ the moment of inertia of the x-axis springs about the z-axis)

The total moment of inertia, $I_z$ of all components oscillating about the z-axis is:

$$I_z = I_{zC} + I_{x_{zs}} + I_{zB} \quad (14)$$

neglecting the x-axis springs $I_{x_{zs}}$ $$I_{zB} = I_{gB} + m_B H^2 \quad (15)$$

where $$h = .707 L_z / 2 = .35 L_z \quad (16)$$

therefore $$I_z = I_{zC} + I_{gB} + .123 m_B L_z \quad (17)$$

In a manner similar to that of Equation 6

$$K_z = \frac{Enbd_z^3}{12 l_z} \quad (18)$$

The natural frequency about the z-axis will, for the present be set equal to the oscillating frequency.

$$f_{oz} = f_{nz} = \frac{1}{2\pi} \sqrt{\frac{K_z}{I_z}} = 3.65 \text{ c.p.s.} \quad (19)$$

substituting (17) and (18) into (19)

$$f_{oz} = f_{nz} = 3.65 = \frac{1}{2\pi} \sqrt{\frac{Enbd_z^3}{12 L_z (I_{zC} + I_{zB} + .123 m_B L_z^2)}} \quad (20)$$

$$475(3.65)^2 L_z (I_{zC} + I_{zB} + .123 m_B L_z^2) = E(nb) d_z^3 \quad (21)$$

$$L_z (I_{zC} + I_{gB} + .23 m_B L_z^2) = 1.58 \times 10^{-4} E(nb) d_z^3 \quad (22)$$

$$(I_{zC} + I_{gB}) L_z + (.123 m_B) L_z^3 = 1.58 \times 10^{-4} E(nb) d_z^3 \quad (23)$$

In Equation 23, modulus E is retained as a variable in order to evaluate its effect later. The parenthesized quantities are constants and will now be evaluated.

$$I_{zC} = I_{zC1} + I_{zC2} \text{ (see Eqation 14)} \quad (24)$$

$$I_{zC1} = I_{xC1} \text{ (symmetry)} = .0235 \text{ gm.} - \text{cm.}^2 \quad (25)$$
$$= 8.03 \times 10^{-6} \text{ lb.} - \text{in.}^2$$

$$I_{zC2} = I_{gC2} + m_{C2} h_{C2}^2 \quad (26)$$

But, $$I_{gC2} = \frac{m}{12}(3r^2 + l^2) \quad (27)$$

$$= \frac{m_C^2}{12}(3r^2 + l) + m_{c2}(h_{C2})^2$$

$$= m_{C2}\left(\frac{3r^2 + l}{12} + h_{C2}^2\right) \quad (28)$$

$$= \frac{.436}{454 \times 386}\left[\frac{3(.188)^2 + l}{12} + (.188)^2\right]$$

$$I_{zC2} = 2.88 \times 10^{-7} \text{ lb.-in.}^2$$

$$I_{zC} = (8.03 + .288) \times 10^{-6} = 8.318 \times 10^{-6} \text{ lb.-in.}^2 \quad (29)$$

For the purpose of calculations, some assumptions can be made regarding the intermediate member 13 shown as subscript B as shown in FIGURE 8.

For $m_B$, it can be assumed that 13 is $1.5 \times 1.5$ inches square $\times .2$ thick and made of aluminum. Retaining means 14 are made of horizontal and vertical pieces and are identical, each being 1 inch long $\times .25$ square of aluminum, 4 pieces.

$$m_B = \frac{(1.5 \times 1.5 \times .2)(.1)}{386} + \frac{4(.25 \times .25 \times 1)(.1)}{386}$$

$$m_B = 1.8 \times 10^{-4} \text{ lbs.} \quad (30)$$

For $I_{gB}$ assume an equivalent rectangular block whose sides L are $1.5 \times 1.5 \times t$ ($t$ being thickness) with mass = $1.8 \times 10^{-4}$ lbs., and a density P.

$$t = \frac{mg}{pL^2} = \frac{1.8 \times 10^{-4} \times 386}{(.1)(1.5)^2} = .309 \text{ in.} \quad (31)$$

From FIGURE 10

$$I_{gB} = m_B / 12 \times (1.5^2 + .3^2) + \frac{1.8 \times 10^{-4}}{12}(2.25 + .09)$$

$$= .35 \times 10^{-4} \text{ lb.-in.}^2 \quad (32)$$

substituting into Equation 23

$$43.3 \times 10^{-6} + 22.2 \times 10^{-6} L_z^3 = 1.58 \times 10^{-4} EnbD_z^3 \quad (33)$$

simplifying 33

$$L_z + .51 L_z^3 = 3.65 E(nb) d_z^3 \quad (34)$$

transposing 34, gives an expression for thickness $d$ in terms of other variables $$d_z = .65 \left(\frac{1}{Enb}\right)^{\frac{1}{3}} (L_z + .51 L_z^2)^{\frac{1}{3}} \quad (35)$$

Figure 11:
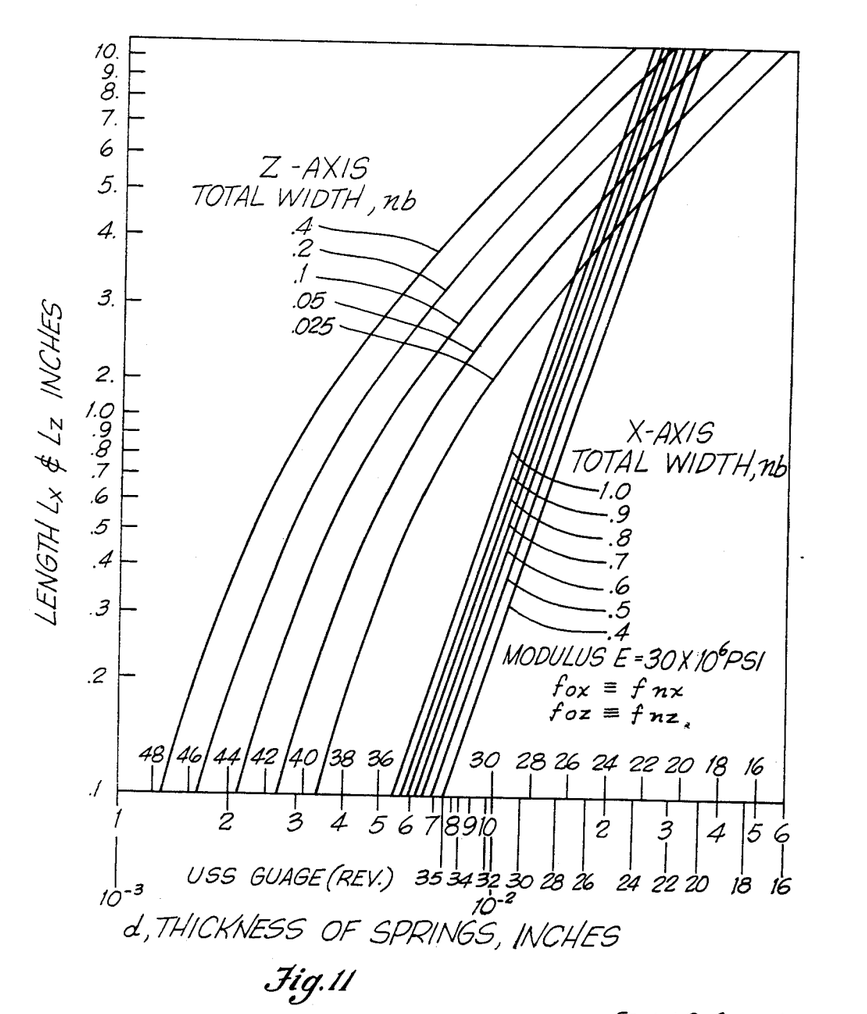
FIGURE 11 is a graph relating to the selection of material about both axes.
Figure 12:
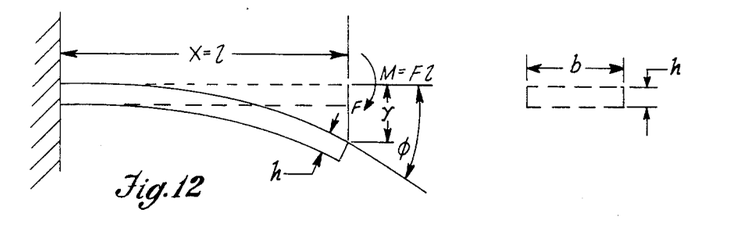
FIGURE 12 gives the mathematical factors required in making certain calculations useful in connection with the present invention; and, FIGURE 13 illustrates graphically the deflection of a beam for a given voltage in connection with the present invention.

FIGURE 11 is a chart of $L_z$ vs $d$ of Equation 35 for a group of widths ($nb$). For convenience, the X-axis length is also plotted from FIGURE 7. FIGURE 11 is for steel beams of modulus $E = 30 \times 10^6$ and a natural frequency of $f_{ox}$ = oscillation frequency $f_{ox}$. Likewise $f_{nz} = f_{oz}$.

From Equation 35 the effect of modulus E is evident. The spring thickness $d'$ of a material of modulus $E'$ is seen to be $$d' = d\left(\frac{E}{E'}\right)^{\frac{1}{3}} \quad (36)$$

Thus, halving the modulus increases the thickness by $(2)^{\frac{1}{3}}$ which is 1.259 or about 26%.

If the beams are to have a natural frequency $fn'$ other than the oscillation frequency $f_o$ which was previously equal to $f_n$ by definition, then the thickness $d$ will change to $d'$.

The x-axis Equations 3 and 6 are used to obtain $$d_x = \left(\frac{48\pi^2 L_x I_x f_{ox}^2}{Enb}\right)\frac{1}{3} \quad (37)$$

and $$d'_x = \left(\frac{48\pi^2 L_s I_x f'_{nx}^2}{Enb}\right)\frac{1}{3} \quad (38)$$

The new thickness in terms of $f'_{nx}$, $f_{ox}$ and $d_x$ (all other quantities including E remaining identical) will be:

$$d'_x = d_x \left(\frac{f'_{nx}}{f_{ox}}\right)\frac{2}{3} \quad (39)$$

For the z-axis, $$d'_z = d_z \left(\frac{f'_{nz}}{f_{oz}}\right)\frac{2}{3} \quad (40)$$

where $d_x$ and $d_z$ are the thickness for $f_o = f_n$ as shown in FIGURE 11.

Having determined the parameters of the crossed pivot spring means, it is evident that it is necessary to keep the pivot springs vibrating at the frequency desired. The particular mode of actuation will also determine the nature of the pivot spring arrangement. This in turn depends on the entire system. After all, the system designer cannot build the other components of a space vehicle or other system requiring scanning means around the scanning mechanism but must fit the scanning mechanism into the general pattern of the system design.

In general two means of actuation are available: electrostrictive and magnetostrictive. It is therefore necessary to develop either a relationship between the cantilever pivot spring beam tip rotation angle $\theta$ and the actuating means V for the general case of electrostrictive actuation wherein the beam is composed of two dissimilar materials joined together to which is applied the electric field V, or, the magnetomotive force M.M.F. in the case of magnetostrictive actuation wherein a dual cantilever beam composed of a single ferromagnetic material is employed to which is applied the magnetomotive force or M.M.F.

Electrostriction may be used in several ways, e.g., polycrystalline electrostriction, piezoelectric effect, and ceramic electrostriction. Thus, if a polycrystalline material is subjected to an electric field its dimensions are modified; a voltage applied across a piece of crystal such as quartz and tourmaline will modify its dimensions. Linearity is most assured at low frequencies. The piezoelectric pre-polarized method products a negative deflection in an A.-C. field. In the other methods, a D.-C. bias voltage must be applied, producing an initial beam deflection "up to" zero, after which the A.-C. produces the required deflection about the biased position. When an electrical potential is applied across a ceramic, it contracts with a resultant strain on the reaction member.

When ferromagnetic material is subjected to a magnetic field its dimensions are modified. The relative change of dimensions is a function of the absolute value of the applied magnetic field, temperature, and nature of the material.

To assist in the selection of material and actuating means, various materials and their properties are outlined in Table I.

Some of the foregoing materials are identified by their trade names.

Regardless of the actual means used for actuating the crossed spring pivots, certain general formulas can be used for the purpose of the necessary calculations. Again, starting with symbols and definitions, $a_s$ = in./in. unit field intensity for material "$s$" electric or magnetic as appropriate
$a_m$ = in./in. unit field intensity for material "$m$" electric or magnetic as appropriate
$q$ = beam deflection
$E_s$ = Young's modulus of material "$s$," in p.s.i.
$E_m$ = Young's modulus of material "$m$" in p.s.i.
$f$ = scan frequency, cycles/sec.
$F$ = force
M.M.F. = magnetomotive force, ampere-turns
$K$ = ratio of Young's moduli = $E_s E_m$
$L$ = length of beam ($L_s$ must be greater than $L_m$)
$\theta$ slope of cantilever beam at end; this equals ½ total desired mirror rotation, radians
$M$ = bending moment = $FL$
$P$ = power = $Mf$ where $M = FL$
$r$ = radius of curvature of beam at end.
$V$ = electric field intensity, volts Applying Hook's law to beam theory, for a cantilever beam of uniform cross-section, loaded at the end by a force F, the deflection at the end is $$q = \frac{FX^3}{3EI} \quad (101)$$

At $X = L$, the slope of beam 12 at the end is $$\theta = \frac{FL^2}{2EI} \text{ radians} \quad (102)$$

The radius of curvature $r$ is given by the expression for small angles in Seely, "Resistance of Material," 2nd ed., chapt. V, par. 43.

$$r = \frac{1}{\frac{d^2 q}{dX^2}}$$

or $$\frac{d^2 q}{dX^2} = \frac{1}{r} \quad (103 \text{ and } 104)$$

Therefore, by differentiation of $$\frac{1}{r} = \frac{2FX}{EI}\bigg]_0^L = \frac{2FL}{EI} \quad (105)$$

Equating the two values of F from (102) and (105)

$$F = \frac{EI}{2rL} = \frac{2EI\phi}{L^2}$$

$$\theta = \frac{1}{r} \times \left(\frac{L}{4}\right) \quad (106)$$

It is thus necessary to develop a voltage V corresponding to the expression $1/r$ for the electrorestrictive application and an M.M.F. equal to $1/r$ for the magnetostrictive case.

*Table 1*

| Type of Material | Specific Material | Used With— | Remarks |
|---|---|---|---|
| Polycrystallines | Barium titanate, Niobates | Conductive silver leads bonded to metals, e.g. steel. | D.-C. field required, properties are a function of temperature to Curie point 0° to 120°; frequency —D.-C. to 10 mc. |
| Piezoelectric | Quartz, Tourmaline | | No D.-C. bias required, but must be pre-polarized, mechanical and electrical effect are reversible, frequency —D.-C. to 10 mc. |
| Magnetostrictive | Nickel, Alfer, Monel, Permalloy, Cekas, Ferrites | | D.-C. bias field required since without D.-C. bias there is a frequency doubling effect, 500 gauss saturation; frequency range, 1 to 100,000 cycles per second; frequency with a D.-C. bias is almost linear. |

To develop an expression for $1/r$ in the electrostrictive case the following may be considered: Timoshenko "Strength of Materials," Part I, Art. 47, develops an expression for the equilibrium conditions at the interface of a beam composed of 2 bonded materials under the influence of temperature variations. The variable $t$ in the Timoshenko book becomes V $$\frac{4}{bh^2r}(E_s I_s + E_m I_m)\left(\frac{1}{E_s}+\frac{1}{E_m}\right)=(a_n-a_s)V\frac{h}{2r} \quad (107)$$

If we let $E_s = KE_m$ and $$I_s = I_m = I = \frac{b}{12} \times \left(\frac{h}{2}\right)3 = \frac{bh^3}{96} \quad (107a)$$

Substituting these values, the above expression becomes:

$$\frac{h}{24r}\left[\frac{(1+K)^2}{K}\right]=(a_m-a_s)V-\frac{h}{2r}$$

further simplification yields an expression for the inverse of the radius of curvature:

$$\frac{1}{r}=\frac{24K(a_m-a_s)V}{h(1+14K+K^2)} \quad (108)$$

Substituting the value of $1/r$ from (108) into (106)

$$\theta=\frac{6K(a_m-a_s)VL}{h(1+14K+K^2)} \quad (109)$$

Transposing, the instantaneous value of the voltage is given as:

$$V=\frac{h(1+14K+K^2)\theta}{6K(a_m-a_s)L} \quad (110)$$

Figure 13:
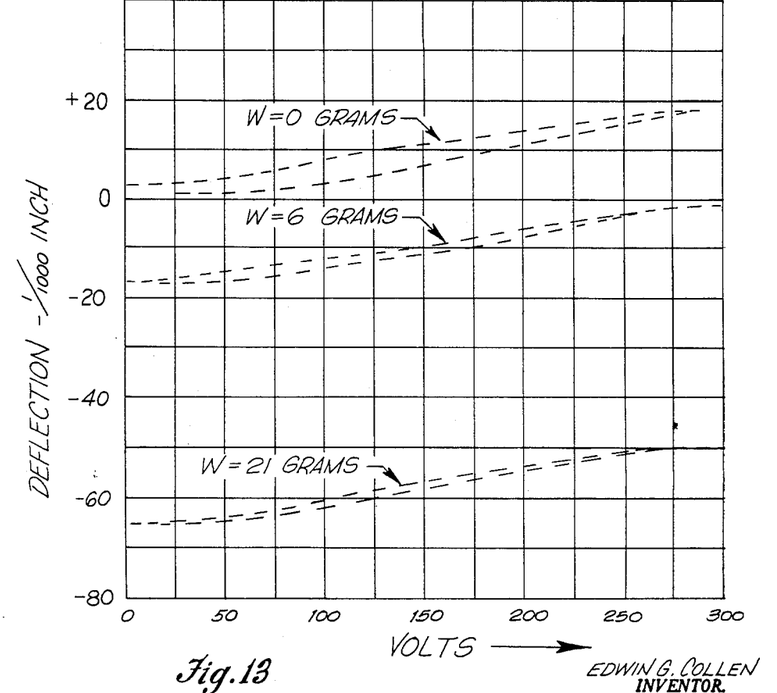

The foregoing method involves use of a bi-material strip e.g., an electrorestrictive barium titanate ceramic material and a flexible metal. Bonded to the flexible metal strip, the ceramic strip contracts lengthwise when a voltage is dropped across it, so that the cantilever beam made of two materials will bend. Provided the beam is not loaded past its elastic limit, the slope of the "Deflection vs. Electric Field Potential" graph is independent of the static loading of the beam and this graph is linear due to the characterisics of the electrorestrictive material. Shown in FIGURE 13 are the Deflection vs. Volts curves for various pre-loadings on the beam. (L.A. Petermann "Electrical Manufacturing," Dec. 1955). Furthermore, the equations derived are suited for use on a metallic-ceramic beam. If the value of $a_m$ is reduced to zero, the remainder of the relationship is perfectly valid.

$$\theta=\frac{6K(a_s)VL}{h(1+14K+K^2)} \quad (111)$$

and $$V=\frac{h(1+14K+K^2)\theta}{6K(a_s)L} \quad (112)$$

In the magnetostrictive case, the analogous expression for M.M.F. becomes evident for a homogeneous metallic beam of thickness $h$ when we let
$a_m$=in./in./unit magnetomotive force
$a_s$=0 since there is no ceramic material.

$$\theta=\frac{a_m L \text{ M.M.F.}}{2.67h} \quad (113)$$

$$\text{M.M.F.}=\frac{2.67h\theta}{a_m L} \quad (114)$$

The power requirement per axis is $P=Mf$ where the bending moment M:
$M=FL$
From Equation 102

$$M=\frac{EI\theta}{L}$$

But since $E=E_s+E_m$ and using the expression for I from Equation 107a, $$M=\frac{bh^3\theta}{96L}(E_s+E_m)$$

then $$P=\frac{bh^3\theta f}{48L}(E_s+E_m) \text{ for 1 beam}$$

Because there are two crossed beams on each axis, the total power per axis is $$P_T=2P=\frac{bh^3\theta f(E_s+E_m)}{288L} \text{ ft.-lb./sec per axis}$$

or $$P_T=\frac{bh^3\theta f(E_s+E_m)\times 10^{-7}}{42.5L} \text{ watts per axis}$$

It is to be observed therefore that the present invention provides for scanning means to scan a very small area which means is adapted to oscillate in azimuth and elevation at predetermined frequencies and generally comprises a scanner 11, a scanner support member 12 on which said scanner is mounted; an intermediate support member 13 at least partially transparent, opposed to said scanner face; first crossed pivot spring means 15 extending from said intermediate member 13 to said scanner support 12 for oscillation in the azimuth axis; a fixed member 17 opposed to said scanner back side; and, second crossed pivot spring means extending between said fixed member 17 and said intermediate member 13 for oscillation in the elevation axis, said azimuth and elevation axes being at right angles, the parameters of said first and second pivot spring means being defined by the formula $$L=\frac{Enbd^3}{475f_n^2 I(x \text{ or } z)}$$

where $L$ is the support spring length between mounts of the elevation or azimuth spring
$E$ is the modulus of elasticity of the springs
$n$ is the total number of springs in both axes
$b$ is the spring width on a side
$d$ is the spring thickness
$f_n$ is the desired natural frequency of oscillation in one or the other axes, and
$I$ is the moment of inertia in the elevation (x-axis) or azimuth (z-axis)

If the springs in any axis are to oscillate at a frequency $f_o$ which is a subharmonic of the natural frequency $f_n'$, where $d$ is the thickness required to keep the springs oscillating at the natural frequency $f_n'$ is $$d'=d\left(\frac{f_n'}{f_o}\right)^{\frac{2}{3}}$$

The scanning means may be actuated by electrostrictive or electromagnetic means. When actuated by electrostrictive means, the springs are beams made of two elongated strips of material one of which is electrostrictive, the other of which is resilient, the strips being joined together along their elongated axis. The spring is oscillated by passing an A.-C. current therethrough at a frequency which is a natural frequency of the spring beam or some subharmonic thereof. When the electromagnetic actuation means are used, a dual cantilever beam is used for each spring, each beam is wire wound in phase with the other beam, the widths of the beams oscillating in azimuth being at right angles to the beams oscillating in elevation. The excitation voltage for each axis must be at the natural frequency or some harmonic thereof of the beams and a D.-C. bias should be used if frequency doubling is to be prevented. The voltage V required to oscillate said springs along each axis, in the case of electrostrictive actuation is $$V = \frac{h(1+14K+K^2)\theta}{6K(a_m - d_s)L}$$

and in the case of electrostrictive actuation the magnetomotive force required is $$M.M.F. = \frac{2.67h\theta}{a_m L}$$

where $h$ is the distance from the center of gravity of the mass to the axis being actuated in inches $K$ is the ratio of Young's moduli for the two materials in the case of electrostrictive actuation $\theta$ is the slope of the cantilever beam at the end or 1/2 the total desired scanner rotational angle in radians $L$ is the beam length $a_s$ and $a_m$ are in./in. unit field intensity of materials "$s$" and "$m$."

Furthermore, the present invention provides a means of actuating a small object such as a reflector, producing simultaneous oscillations about two orthogonal axes whose plane may be the reflector surface. The oscillation frequencies in the two axes may be different. The scanning device herein described has no mechanical backlash, bearings, wear or friction. No lubrication is required. It is perfectly elastic within the elastic limits. Fatigue stresses are extremely low. For small deflections, there is a negligible rotation shift, of the order of 1% of the deflection angle.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claim.

I claim:

A scanner mechanism, comprising in combination:

a scanner to direct light rays along a path;

an extended mounting and scanner support member on which said scanner is centrally mounted;

an extended intermediate support member at least partially transparent facing said scanner, permitting the scanner to scan therethrough;

a first two pairs of dual cantilever beams forming crossed spring pivots, including in phase windings around each of said pairs of beams, said beams being affixed to and extending between said scanner support member and said intermediate member, corresponding crossed springs in each of said pairs being in the same plane and affixed to said intermediate member on the one and the other side of said scanner so as to cause said scanner to oscillate to and fro in a first plane at right angles to said light path when actuated by an electric current through said windings;

a flat fixed member in back of said scanner;

a second two pairs of dual cantilever beams forming crossed spring pivots, including in phase windings around each of said pairs of beams, said beams being affixed to and extending between said fixed and intermediate members, disposed so as to cause said intermediate member to oscillate to and fro in a second plane at right angles to both said first plane and said light path when actuated by an electric current through said windings, said first and second pairs of crossed spring pivots being so constructed as to oscillate at different natural oscillating frequencies; and, an A.-C. electric power source coupled to said windings to actuate said first and second pairs of beams and cause them to oscillate as A.-C. current passes through said windings.

References Cited by the Examiner

UNITED STATES PATENTS

| | | | |
|---|---|---|---|
| 1,760,198 | 5/30 | Hough | 178—7.6 |
| 2,779,231 | 1/57 | Drodofsky | |
| 2,920,529 | 1/60 | Blythe | |
| 3,013,467 | 12/61 | Minsky | 88—14 |
| 3,044,354 | 7/62 | Brosicke | 88—40 |

FOREIGN PATENTS

| | | |
|---|---|---|
| 480,673 | 2/38 | Great Britain |
| 876,344 | 8/61 | Great Britain |

JEWELL H. PEDERSEN, *Primary Examiner.*

EMIL G. ANDERSON, *Examiner.*